(12) United States Patent
Gisoldi

(10) Patent No.: US 9,559,444 B1
(45) Date of Patent: Jan. 31, 2017

(54) QUICK CONNECTION BATTERY TERMINAL

(71) Applicant: TYCO ELECTRONICS BRASIL LTDA., Bragança Paulista (BR)

(72) Inventor: Mauricio Gisoldi, Braganca Paulista (BR)

(73) Assignee: TYCO ELECTRONICS BRASIL LTDA., Sao Paulo (BR)

( * ) Notice: Subject to any disclaimer, the term of this patent is extended or adjusted under 35 U.S.C. 154(b) by 0 days.

(21) Appl. No.: 15/065,283

(22) Filed: Mar. 9, 2016

(51) Int. Cl.
| | |
|---|---|
| *H01R 4/50* | (2006.01) |
| *H01R 11/28* | (2006.01) |
| *H01M 2/30* | (2006.01) |
| *H01R 13/629* | (2006.01) |

(52) U.S. Cl.
CPC ............ *H01R 11/282* (2013.01); *H01M 2/305* (2013.01); *H01M 2220/20* (2013.01); *H01R 11/285* (2013.01); *H01R 11/287* (2013.01); *H01R 13/62933* (2013.01)

(58) Field of Classification Search
USPC ................................................. 439/754–773
See application file for complete search history.

(56) References Cited

U.S. PATENT DOCUMENTS

| | | | | |
|---|---|---|---|---|
| 2,445,946 | A * | 7/1948 | Harper ................... | H01R 4/489 24/68 BT |
| 3,521,223 | A * | 7/1970 | Martinez .............. | H01R 11/282 439/726 |
| 3,529,281 | A * | 9/1970 | Martinez .............. | H01R 11/282 439/726 |
| 6,872,099 | B2 | 3/2005 | Cret | |
| 6,884,123 | B2 * | 4/2005 | Kim ...................... | H01M 2/305 439/754 |
| 6,971,925 | B1 | 12/2005 | Orange | |
| 7,303,448 | B1 | 12/2007 | Sproesser | |
| 7,374,464 | B1 | 5/2008 | Vicenza et al. | |
| 7,749,031 | B2 * | 7/2010 | Detter .................. | H01R 11/282 439/772 |
| 7,938,692 | B2 * | 5/2011 | Vejux ................... | H01R 11/282 439/772 |
| 8,075,352 | B2 * | 12/2011 | Kim ...................... | H01R 11/284 439/759 |

FOREIGN PATENT DOCUMENTS

GB    2184900 A  *  7/1987  ........... H01R 11/282

* cited by examiner

*Primary Examiner* — Tho D Ta

(57) ABSTRACT

A battery terminal for terminating to a terminal post of a battery. A lever is rotatably mounted to a lever engaging portion and includes an engagement member with a pair of mounting members extending therefrom. The mounting members are spaced apart by a first distance which is greater than a second distance which is the distance that the lever receiving members are spaced from each other. The mounting members are positioned to the outside of the lever receiving members. Camming members extend from the mounting members. The camming members have engaging portions which extend inward from the mounting members. The camming members and the engaging portions have an elastic spring behavior which allows the camming members and the engaging portions to be elastically deformed when the lever is rotated between an open position and a closed position.

19 Claims, 3 Drawing Sheets

QUICK CONNECTION BATTERY TERMINAL

FIELD OF THE INVENTION

The present invention relates to battery terminal connectors. More particularly, the invention relates to quick connect battery terminal connectors.

BACKGROUND OF THE INVENTION

Automobile engine compartments contain many components which substantially fill the compartment, making routine maintenance a challenge. One such component is the battery. Batteries typically are extremely heavy and have fixed positive and negative charged locations, often in the form of exterior extending posts for interconnection with corresponding connectors, usually referred to as battery terminals. Conventional battery terminals typically include threaded fasteners that must be actuated to draw the battery terminal into engagement with the corresponding battery post. Typically, a corresponding electrical cable is crimped onto each battery terminal representing an in-line orientation which may or may not be the most convenient orientation for engaging the battery post.

These conventional battery terminal connectors have a disadvantage in that tools must be used to effectively tighten and loosen the bolt. Assembly of the battery terminal connector is therefore time consuming and complicated, especially if the terminal and/or the battery is not conveniently located. Because the entire battery terminal connector is generally formed of a conductive material, there is a risk of accidental shock or short circuiting during the assembly and disassembly thereof. Additionally, these conventional battery terminal connectors do not provide an easy or reliable method for attachment of an electrical cable thereto.

The use of such conventional battery terminal connectors is problematic in many instances, as additional labor and expense is needed to ensure proper termination. For example, when car manufacturer's export vehicles overseas, the batteries must be disconnected when the car is transported onboard the ship and reconnected when the car arrives at port. As conventional battery terminal connectors require the use of tooling for disconnection and connection to the battery, significant labor and expense is required.

To address some of these concerns, battery terminals which do not require tools for assembly have been developed. An example of such a known battery terminal is disclosed by Orange in U.S. Pat. No. 6,971,925 entitled Rotatable Connector for a Battery Cable Clamp. That battery clamp is disclosed as having first and second legs extending from a post section. A connecting pin passes through apertures formed in each leg such that it is coupled to a handle on one end and an end nut on an opposite end thereof. The connecting pin also passes through a seat upon which a boss of the handle rests during rotation to facilitate a clamping action between the legs. On a rear end of the clamp, a cable joining section is provided as a threaded post which is secured to a flat plate. Although the design disclosed in this reference presents a desirable tool-less clamping operation, it has several drawbacks in that a seat is required to facilitate clamping and also presents a drawback in that the flat plate for supporting the threaded post may bend or otherwise break away from the remainder of the assembly. Additionally, the design disclosed in this reference requires many individual parts, which makes the design more costly and difficult to assemble.

Another example is disclosed in U.S. Pat. No. 7,303,448 which discloses a battery terminal connector having a main body including a clamp having first and second flanges extending from ends thereof and a terminal receiving member extending from the first flange. A lever is removeably attached to the first and second flanges by a threaded shaft and a knurled nut. The lever is connected to the threaded shaft by an eyelet and is rotatable between an open position and a closed position. The lever pulls the first and second flanges toward each other in the closed position. A ring terminal has a ring connected to the terminal receiving member.

In contrast, U.S. Pat. No. 7,374,464 discloses a battery terminal including a base configured to selectably engage a terminal tongue. A post-engaging portion is configured to receive a battery post, one end of the post-engaging portion extending contiguously from the base. An opposite end of the post-engaging portion terminates at a nonlever receiving member adjacent to the base. A lever-holding portion extends from the base toward the nonlever receiving member. A lever is pivotably connected to the lever-holding portion about an axis, the lever having a cam-shaped portion. In response to pivotal motion of the lever toward a closed position, the cam-shaped portion is urged into contact with the nonlever receiving member, the nonlever receiving member pivoting about an end along the base to resiliently draw the post-engaging portion into a gripping arrangement for engagement with the battery post. However, such a battery terminal has a concentration of forces located in the transition area which can cause ineffective electrical contact over the life of the battery terminal.

It would be beneficial to provide a battery terminal that can be easily connected and disconnected to a battery post. It would also be beneficial to provide a terminal which generates sufficient normal force between the battery terminal and the battery post to ensure and maintain a gas tight electrical connection between the terminal and the post over the life of the terminal.

SUMMARY OF THE INVENTION

An embodiment is directed to a battery terminal for terminating to a terminal post of a battery. The battery terminal includes a cable attachment section, a lever engaging portion having lever receiving members, a post engaging portion and a lever. The lever is rotatably mounted to the lever engaging portion and includes an engagement member with a pair of mounting members extending therefrom. The mounting members are spaced apart by a first distance which is greater than a second distance which is the distance that the lever receiving members are spaced from each other. The mounting members are positioned to the outside of the lever receiving members. Camming members extend from the mounting members. The camming members have engaging portions which extend inward from the mounting members. The camming members and the engaging portions have an elastic spring behavior which allows the camming members and the engaging portions to be elastically deformed when the lever is rotated between an open position and a closed position. The rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post.

An embodiment is directed to a battery terminal for terminating to a terminal post of a battery. The battery terminal includes a cable attachment section, a lever engaging portion having lever receiving members, a post engaging portion and a lever. The lever is rotatably mounted to the lever engaging portion and includes an engagement member with a pair of mounting members extending therefrom. The mounting members are spaced apart by a first distance which is greater than a second distance which is the distance that the lever receiving members are spaced from each other. The mounting members are positioned to the outside of the lever receiving members. Camming members extend from the mounting members. The camming members have engaging portions which extend inward from the mounting members. The engaging portions of the camming portions are spaced apart by a third distance which is less than the second distance. The camming members and the engaging portions have an elastic spring behavior which allows the camming members and the engaging portions to be elastically deformed when the lever is rotated between an open position and a closed position. The rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post.

An embodiment is directed to a battery terminal for terminating to a terminal post of a battery. The battery terminal includes a cable attachment section, a lever engaging portion having two lever receiving members which extend from ends of the post engaging portion, a post engaging portion and a lever. The lever is rotatably mounted to the lever engaging portion and includes an engagement member with a pair of mounting members extending therefrom. The mounting members are spaced apart by a first distance which is greater than a second distance which is the distance that the lever receiving members are spaced from each other. The mounting members are positioned to the outside of the lever receiving members. Camming members extend from the mounting members. The camming members have engaging portions which extend inward from the mounting members. The engaging portions of the camming portions are spaced apart by a third distance which is less than the second distance. The camming members and the engaging portions have an elastic spring behavior which allows the camming members and the engaging portions to be elastically deformed when the lever is rotated between an open position and a closed position. The engaging portions are angled or curved to act as lead-in surfaces to gradually and evenly engage the lever receiving members, allowing the force needed to move the lever between the open position and the closed position to be gradually built up, allowing for the lever to be moved in an easy, controlled manner without the use of tools. The rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
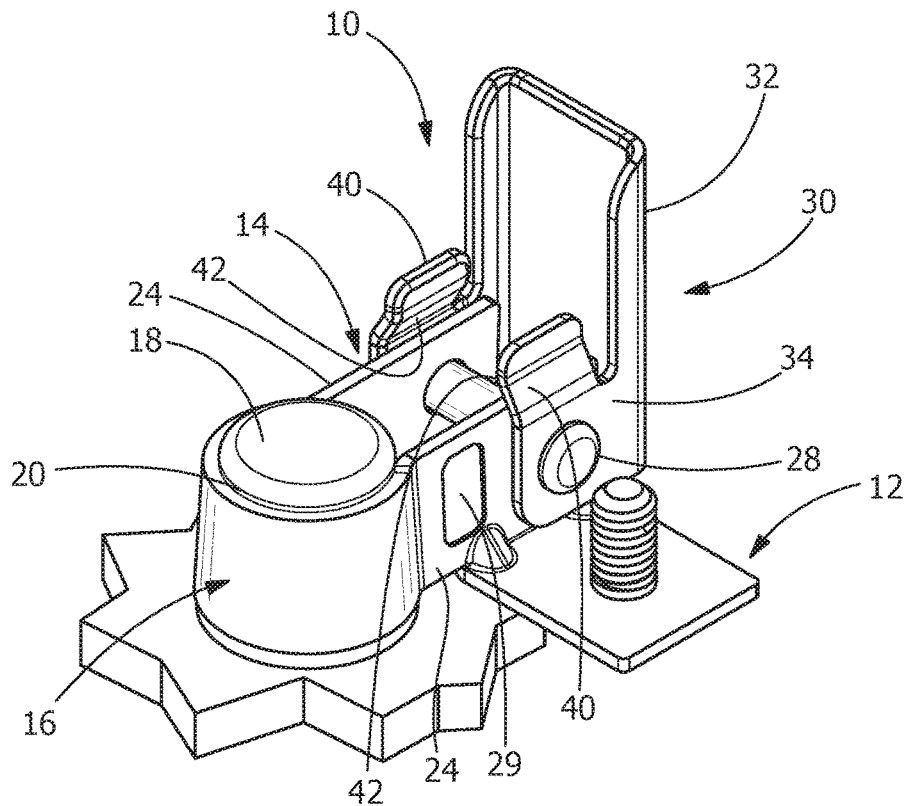
FIG. 1 is a top perspective view of an illustrative embodiment of a battery terminal of the present invention positioned proximate a battery post, a lever of the battery terminal is shown in an open position.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

FIGS. 1 through 4 illustrate an embodiment of a battery terminal 10 for use with providing an electrical connection or engagement with a battery post 18 of a battery (FIG. 1). The electrical connection can be effected without a special tool. The battery terminal cooperates with the post 18 to provide normal force between the terminal 10 and the post 18, as will be more fully described, to provide and maintain a gas tight electrical connection between the battery terminal and the battery post over time.

Figure 2:
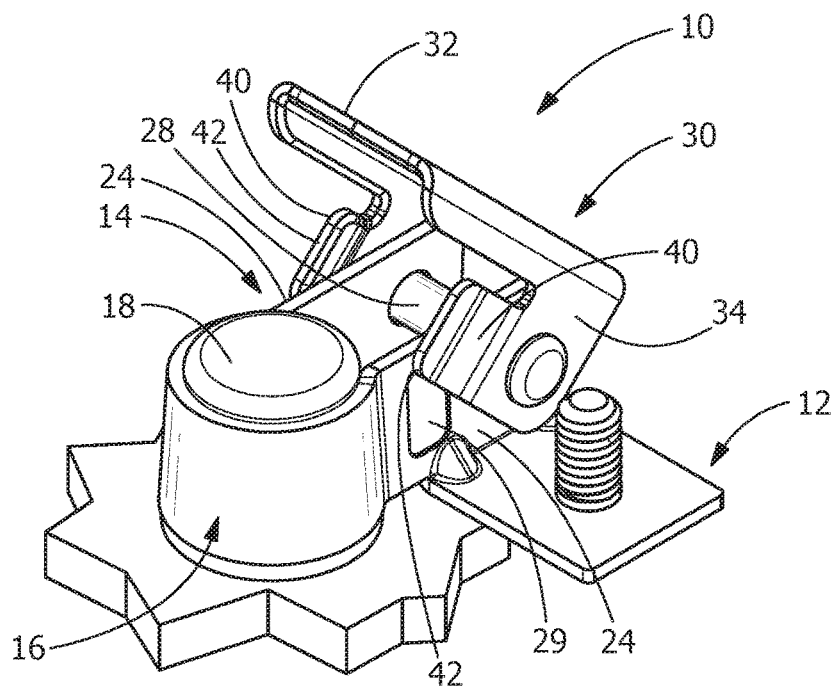
FIG. 2 is a top perspective view of the battery terminal of FIG. 1, the lever of the battery terminal is shown in a partially closed position.
Figure 3:
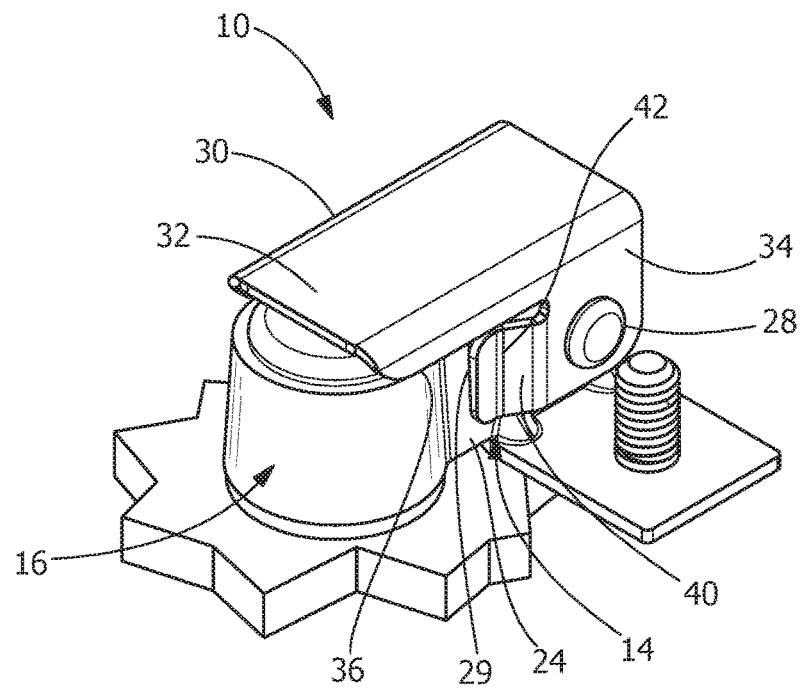
FIG. 3 is a top perspective view of the battery terminal of FIG. 1, the lever of the battery terminal is shown in a closed position.

Referring to FIGS. 1 through 3, the term battery post is intended to refer to a protrusion extending from a battery that corresponds to one of the charged, i.e., positive or negative, portions of the battery. In the illustrative embodiment shown, the battery post 18 resembles a cylindrical segment having an outside surface 20 such that when engaged with an inside surface 22 (FIG. 4) of a post-engaging portion 16 of the battery terminal 10, an electrical connection is formed between the post-engaging portion 16 and the battery post 18.

Figure 4:
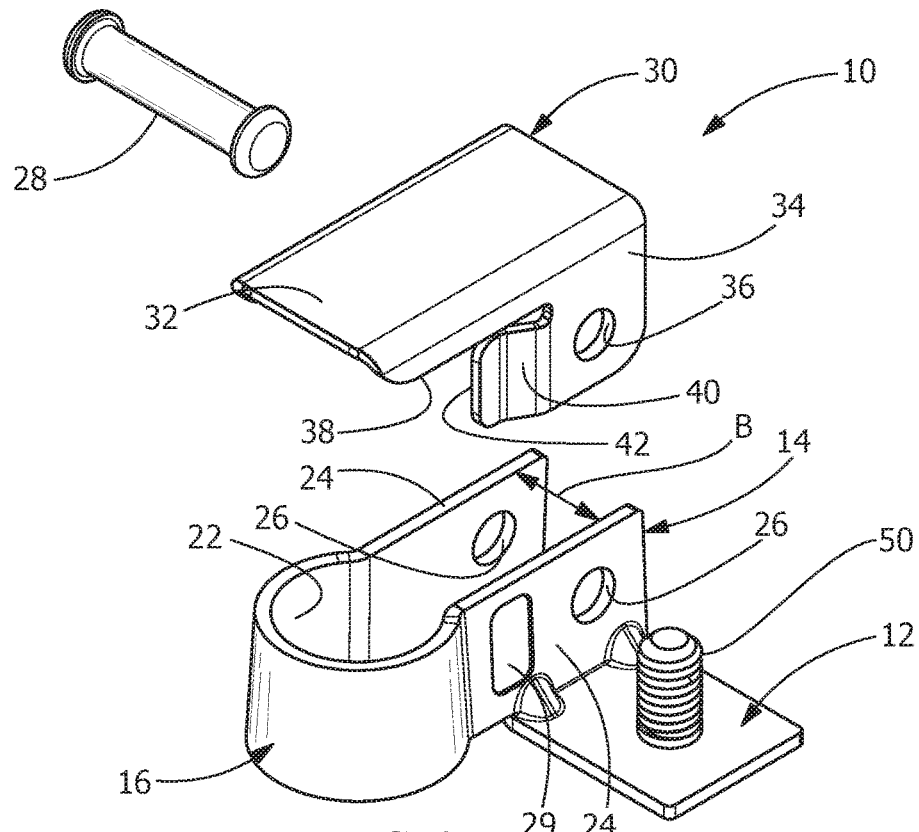
FIG. 4 is an exploded perspective view of the battery terminal shown in FIG. 1.

As best shown in FIG. 4, battery terminal 10 includes a cable attachment section 12, a lever engaging portion 14, and the post-engaging portion 16. In the embodiment shown, the post engaging portion 16 has as an annular shape, for engaging the battery post 18. As shown in FIG. 4, the post-engaging portion 16 extends from the lever engaging portion 14. To ease installation over the battery post 18, post-engaging portion 16 includes a slightly tapered profile, as best shown in FIGS. 1 and 4.

Components of the battery terminal 10 are made of material of sufficient structural strength and electrical conductivity to effect an electrical connection when engaged with a battery post. Such material includes, but is not limited to, copper alloys or steel alloys. Although the component material is typically electrically conductive, electrically conductive coatings, such as tin or other materials, may also be used.

As best shown in FIG. 4, the lever engaging portion 14 includes two lever receiving members 24 which extend from ends of the post engaging portion 16. In the illustrative embodiment shown, the lever receiving members 24 have a similar configuration and are essentially or approximately parallel to each other when the terminal 10 is in the open position, as shown in FIG. 1. Each lever receiving member 24 includes an opening 26 which extends therethrough. The openings 26 of each lever receiving member 24 are aligned to receive a mounting pin 28 therethrough. A cam receiving recess 29 is positioned on each lever receiving member 24.

Figure 5:
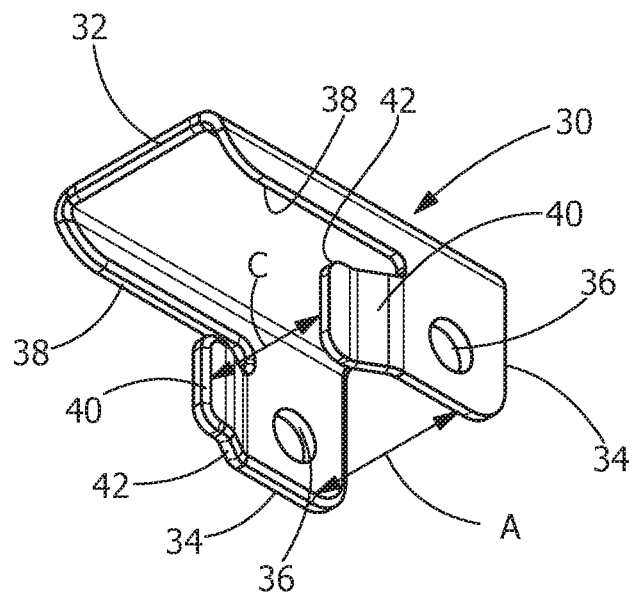
FIG. 5 is a bottom perspective view of the lever of the battery terminal.

A lever 30 is rotatably mounted to the lever engaging portion 14. As best shown in FIG. 5, the lever 30 includes an engagement member 32 with a pair of mounting members 34 extending therefrom. The mounting members 34 include openings 36 for receiving the mounting pin 28 therein. The mounting members 34 are spaced apart by a distance A (FIG. 5). The distance A is greater than the distance B (FIG. 4), which is the distance that the lever receiving members 24 are spaced from each other. Consequently, when the lever 30 is positioned on the lever engaging portion 14, the mounting members 34 are positioned to the outside of the lever receiving members 24. The engagement members 32 include terminal engaging portions 38 (FIGS. 4 and 5) which extend at an angle from the engagement members 32.

Camming members 40 extend from the mounting members 34. The camming members 40 have angled or curved lever receiving member engaging portions 42. The camming members 40 and the engaging portions 42 are configured to have an elastic spring behavior which allows the camming members 40 and the engaging portions 42 to be elastically deformed when the lever 30 is rotated between the open and closed positions. In the illustrative embodiment shown, each of the engaging portions 42 has an arcuate configuration, but other configurations can be used. Each of the engaging portions 42 extends inward from the mounting members 34 toward an opposed engaging portion 42. The engaging portions 42 of the camming portions 40 are spaced apart by a distance C (FIG. 5). The distance C is less than the distance B, which is the distance that the lever receiving members 24 are spaced from each other. The amount of elastic deformation of the camming members 40 and the engaging portions 42 can be controlled based on factors such as, but not limited to, the configuration and material used for the camming members 40 and the engaging portions 42.

Figure 6:
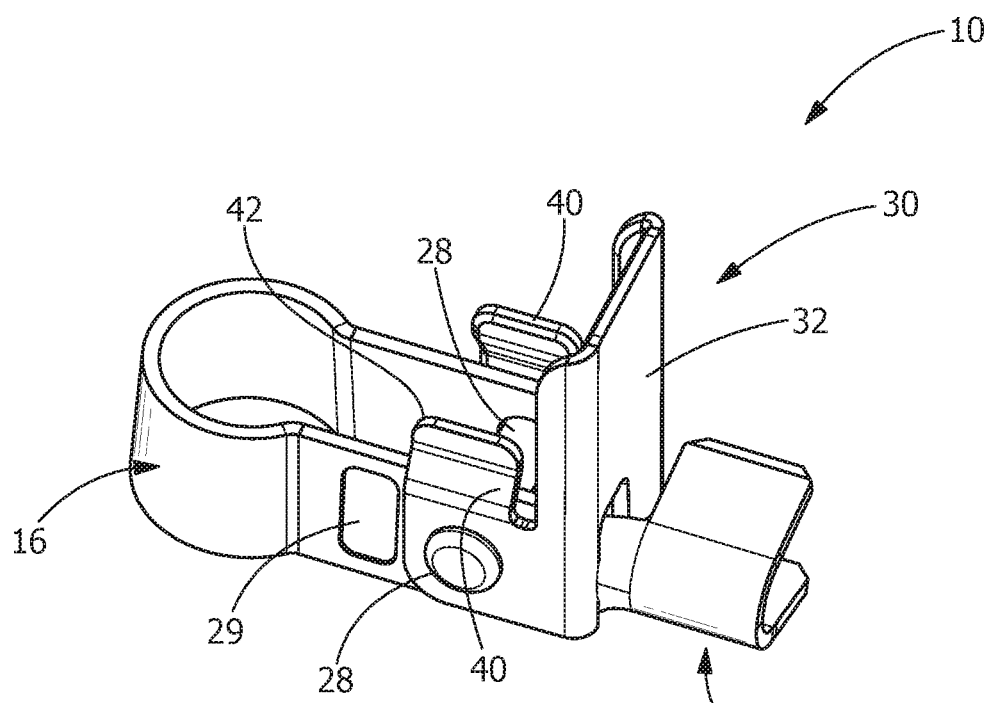
FIG. 6 is a top perspective view of an alternate illustrative embodiment of a battery terminal of the present invention positioned proximate a battery post, a lever of the battery terminal is shown in an open position.

In the embodiment shown in FIGS. 1 through 4, cable attachment section 12 includes a projection 50 which receives a component of a battery cable (not shown) to place the terminal 10 in electrical engagement with the battery cable. Alternately, a feature, such as an opening or slot (not shown) may be formed in the cable attachment section 12 to engage a projection of the battery cable. FIG. 6 illustrates an alternate illustrative embodiment in which the cable attachment section 12 is a wire barrel which is attached to the mounting pin 28.

When assembled, the lever 30 is pivotably or rotatably connected to the lever engaging portion 14 by pin 28, thereby allowing lever 30 to rotate about the axis of pin 28. The lever 30 is moveable between the open position, as shown in FIG. 1 and the closed position as shown in FIG. 3, as will be more fully described.

Referring to FIG. 1, with the lever 30 in the open position, the terminal 10 can be inserted on the battery post 18. In this position, two lever receiving members 24 of the lever engaging portion 14 are essentially or approximately parallel to each other, such that the lever receiving members 24 are spaced from each other by the distance B (FIG. 4). In this position, the inside diameter of the post-engaging portion 16 is larger than the diameter of the post, thereby allowing the post-engaging portion 16 to be easily inserted onto the post 18 or removed from the post 18 as needed.

As the lever 30 is moved to the clamped or closed position, the lever 30 is rotated from the unclamped or open position shown in FIG. 1, through the position shown in FIG. 2, to the closed position shown in FIG. 3.

As shown in FIG. 2, as the lever 30 is pivotably rotated about the pin 28, the engaging portions 42 engage respective lever receiving member 24. The pin 28 does not prohibit the movement of the lever receiving members 24 toward each other. Consequently, the rotation of the engaging portions 42, which are spaced closer together than the lever receiving members 24, causes the engaging portions 42 to exert a force on the lever receiving members 24, causing the lever receiving members 24 to move toward each other. As this occurs, the inside diameter of the post-engaging portion 16 is reduced to tighten about the post 18.

As the lever 30 is rotated, the angle or curve of the engaging portions 42 act as lead-in surfaces to gradually and evenly engage the lever receiving members 24. This prevents the engaging portions 42 and the lever 30 from stubbing against the lever receiving members 24 as rotation occurs. This also allows the force needed to move the lever 30 between the unclamped position and the clamped position to be gradually built up or lessened, allowing for the lever to be moved in an easy, controlled manner without the use of tools.

The progressive engagement of the engaging portions 42 with the lever receiving members 24 creates a gradient force which causes the post-engaging portion 16 to provide secure clamping engagement about the post 18. The use of the cam members 40 also creates a controlled, specific and repeatable force which causes a specific movement or deformation of the lever engaging portion 14 and the post-engaging portion 16, which in turn provides a controlled, specific and repeatable electrical connection between the battery terminal 10 and the post 18.

As the continued rotation occurs, the engaging portions 42 of the lever 30 increasingly urge the lever receiving member 24 toward each other. In addition, as the rotation continues the engaging portions 42 are moved into cooperation with the cam receiving recesses 29, until the engaging portions 42 are resiliently displaced into the cam receiving recesses 29. Rotation of the lever 30 is continued until the lever 30 is moved to the clamped or closed position, as shown in FIG. 3. In this position, the engaging portions 42 are positioned in the cam receiving recesses 29, thereby providing a type of locking mechanism to hold the lever 30 in the closed position.

In the closed position, the engaging portions 36 of the engagement members 32 engage the post-engaging portion 16. In this position, the engaging portions 42 of the lever 30 are maintained in engagement with the lever receiving member 24 camming members 40 to exert a normal force on the lever receiving members 24. Due to the configuration of the camming members 40, the normal force exerted by the camming members 40 on the lever receiving members 24 will not relax over time, thereby maintaining a gas tight electrical connection between the post 18 and the post-engaging portion 16 over the life to the battery terminal 10. The resulting stresses created by the activation of the lever 30 from the open position to the closed position will be distributed over the entire post-engaging portion 16.

As the lever 30 is moved from open position to the closed position, the post-engaging portion 16 is subjected to a tensile force, as the diameter of the post-engaging portion 16 cannot be reduced beyond the diameter of the solid battery post 18. The post-engaging portion 16 is configured to elastically deform while not exceeding the yield strength of the material when the lever 30 is moved to the closed position, thereby providing a stable gas tight electrical contact interface between the post-engaging portion 16 and the post 18 over the required life cycle of the battery terminal.

In order to return the lever 30 to the open position, sufficient force must be applied to the lever 30 to cause the engaging portions 42 to be resiliently deformed outward to move beyond the walls of the cam receiving recesses 29, thereby allowing the lever to rotate back to the open position.

The present invention thus allows for the clamping and unclamping of the battery terminal to the battery post without need for separate fastening members to hold the battery terminal onto the battery post.

As the battery terminal of the present invention is designed to preferably terminate a battery cable to a post of a battery, two battery terminals are commonly employed with a single battery. Often, the positive post has a different diameter from the negative battery post. It is contemplated that two different size battery terminals may be manufactured. One would be for the positive post which has a first size and the other would be for the negative post which has a second size different from the first size. In these instances, the battery terminal of the present invention may also be color coded to indicate which size and which terminal is to be used with each connector.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A battery terminal for terminating to a terminal post of a battery, the battery terminal comprising;
   a lever engaging portion having lever receiving members;
   a post engaging portion;
   a lever rotatably mounted to the lever engaging portion, the lever including an engagement member with a pair of mounting members extending therefrom, the mounting members spaced apart by a first distance which is greater than a second distance which is the distance that the lever receiving members are spaced from each other, the mounting members positioned to the outside of the lever receiving members;
   camming members extending from the mounting members, the camming members having engaging portions extending inward from the mounting members, the camming members and the engaging portions having an elastic spring behavior which allows the camming members and the engaging portions to be elastically deformed when the lever is rotated between an open position and a closed position;
   cam receiving recesses positioned on the lever receiving members;
   wherein the rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post;
   wherein as the rotation of the lever from the open position to the closed position occurs the engaging portions of the camming members are moved into cooperation with the cam receiving recesses until the engaging portions are resiliently displaced into the cam receiving recesses to hold the lever in the closed position.

2. The battery terminal as recited in claim 1, wherein the post-engaging portion extends from the lever engaging portion, the post-engaging portion has as an annular shape for engaging the post of the battery, the post-engaging portion has a tapered profile.

3. The battery terminal as recited in claim 1, wherein the engagement member has terminal engaging portions which extend at an angle from a main portion of the engagement member.

4. The battery terminal as recited in claim 1, wherein the engaging portions of the camming members are spaced apart by a third distance which is less than the second distance.

5. The battery terminal as recited in claim 1, wherein a cable attachment section includes a projection which receives a component of a battery cable to place the terminal post in electrical engagement with the battery cable.

6. The battery terminal as recited in claim 1, wherein a cable attachment section includes a wire barrel which receives a component of a battery cable to place the terminal post in electrical engagement with the battery cable.

7. The battery terminal as recited in claim 1, wherein the lever engaging portion has two lever receiving members which extend from ends of the post engaging portion.

8. The battery terminal as recited in claim 7, wherein the lever receiving members are approximately parallel to each other when the battery terminal is in the open position.

9. The battery terminal as recited in claim 7, wherein the lever receiving members have openings which extend therethrough, the openings of each of the lever receiving member are aligned to receive a mounting pin therethrough.

10. The battery terminal as recited in claim 9, wherein the mounting members include openings for receiving the mounting pin therein.

11. The battery terminal as recited in claim 1, wherein the engaging portions are angled or curved.

12. The battery terminal as recited in claim 11, wherein as the lever is rotated, the angle or curve of the engaging portions act as lead-in surfaces to gradually and evenly engage the lever receiving members, allowing the force needed to move the lever between the open position and the closed position to be gradually built up, allowing for the lever to be moved in an easy, controlled manner without the use of tools.

13. A battery terminal for terminating to a terminal post of a battery, the battery terminal comprising;
 a lever engaging portion having lever receiving members;
 a post engaging portion;
 a lever rotatably mounted to the lever engaging portion, the lever including an engagement member with a pair of mounting members extending therefrom, the mounting members spaced apart by a first distance which is greater than a second distance which is the distance that the lever receiving members are spaced from each other, the mounting members positioned to the outside of the lever receiving members;
 camming members extending from the mounting members, the camming members having engaging portions extending inward from the mounting members, the engaging portions of the camming members spaced apart by a third distance which is less than the second distance, the camming members and the engaging portions having an elastic spring behavior which allows the camming members and the engaging portions to be elastically deformed when the lever is rotated between an open position and a closed position;
 cam receiving recesses positioned on the lever receiving members;
 wherein the rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post;
 wherein as the rotation of the lever from the open position to the closed position occurs the engaging portions of the camming members are moved into cooperation with the cam receiving recesses until the engaging portions are resiliently displaced into the cam receiving recesses to hold the lever in the closed position.

14. The battery terminal as recited in claim 13, wherein the lever engaging portion has two lever receiving members which extend from ends of the post engaging portion.

15. The battery terminal as recited in claim 14, wherein the lever receiving members are approximately parallel to each other when the battery terminal is in the open position.

16. The battery terminal as recited in claim 15, wherein the lever receiving members have openings which extend therethrough, the openings of each of the lever receiving member are aligned to receive a mounting pin therethrough, the mounting members include openings for receiving the mounting pin therein.

17. The battery terminal as recited in claim 13, wherein the engaging portions are angled or curved.

18. The battery terminal as recited in claim 17, wherein as the lever is rotated, the angle or curve of the engaging portions act as lead-in surfaces to gradually and evenly engage the lever receiving members, allowing the force needed to move the lever between the open position and the closed position to be gradually built up, allowing for the lever to be moved in an easy, controlled manner without the use of tools.

19. A battery terminal for terminating to a terminal post of a battery, the battery terminal comprising;
 a lever engaging portion having two lever receiving members extending from ends of the post engaging portion;
 a post engaging portion;
 a lever rotatably mounted to the lever engaging portion, the lever including an engagement member with a pair of mounting members extending therefrom, the mounting members spaced apart by a first distance which is greater than a second distance which is the distance that the lever receiving members are spaced from each other, the mounting members positioned to the outside of the lever receiving members;
 camming members extending from the mounting members, the camming members having engaging portions extending inward from the mounting members, the engaging portions of the camming members spaced apart by a third distance which is less than the second distance, the camming members and the engaging portions having an elastic spring behavior which allows the camming members and the engaging portions to be elastically deformed when the lever is rotated between an open position and a closed position, the engaging portions being angled or curved to act as lead-in surfaces to gradually and evenly engage the lever receiving members, allowing the force needed to move the lever between the open position and the closed position to be gradually built up, allowing for the lever to be moved in an easy, controlled manner without the use of tools;
 cam receiving recesses positioned on the lever receiving members;
 wherein the rotation of the lever from the open position to the closed position causes the engaging portions to progressively engage the lever receiving members, creating a controlled, specific and repeatable force which causes a specific movement or deformation of the lever engaging portion and the post-engaging portion, which in turn provides a controlled, specific and repeatable electrical connection between the battery terminal and the battery post;

wherein as the rotation of the lever from the open position to the closed position occurs the engaging portions of the camming members are moved into cooperation with the cam receiving recesses until the engaging portions are resiliently displaced into the cam receiving recesses to hold the lever in the closed position.

* * * * *